US011425156B2

(12) United States Patent
Sofer et al.

(10) Patent No.: US 11,425,156 B2
(45) Date of Patent: Aug. 23, 2022

(54) DYNAMIC GATHERING OF ATTACK SYMPTOMS

(71) Applicant: INTERNATIONAL BUSINESS MACHINES CORPORATION, Armonk, NY (US)

(72) Inventors: Oded Sofer, Midreshet Ben Gurion (IL); Zamir Paltiel, Modiin (IL)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 16/821,375

(22) Filed: Mar. 17, 2020

(65) Prior Publication Data
US 2021/0297436 A1 Sep. 23, 2021

(51) Int. Cl.
*H04L 29/06* (2006.01)
*H04L 9/40* (2022.01)
*G06F 16/24* (2019.01)

(52) U.S. Cl.
CPC .......... *H04L 63/1425* (2013.01); *G06F 16/24* (2019.01); *H04L 63/20* (2013.01)

(58) Field of Classification Search
CPC ...... H04L 63/1425; H04L 63/20; G06F 16/24
See application file for complete search history.

(56) References Cited

U.S. PATENT DOCUMENTS

| | | | | |
|---|---|---|---|---|
| 8,621,618 | B1 * | 12/2013 | Ramsey | G06F 21/554 726/22 |
| 9,979,742 | B2 * | 5/2018 | Mumcuoglu | G06F 21/552 |
| 2005/0262562 | A1 * | 11/2005 | Gassoway | H04L 43/00 726/22 |
| 2015/0288709 | A1 * | 10/2015 | Singhal | H04L 63/1425 726/23 |
| 2016/0065620 | A1 * | 3/2016 | Liu | H04L 63/1408 726/1 |
| 2017/0223032 | A1 * | 8/2017 | El-Moussa | H04L 63/1425 |
| 2017/0324767 | A1 | 11/2017 | Srivastava | |

(Continued)

FOREIGN PATENT DOCUMENTS

| | | |
|---|---|---|
| WO | 20141476181 W | 9/2014 |
| WO | 20161390971 W | 9/2016 |

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Shin-Hon (Eric) Chen
(74) *Attorney, Agent, or Firm* — Dmitry Paskalov

(57) ABSTRACT

Techniques for detecting network intrusions are disclosed. An example intrusion detection system includes a storage device to store audit data generated by a network traffic analyzer in accordance with an audit policy that determines an auditing level. The system also includes a processor to receive a case defined by a case definition, wherein the case definition comprises a plurality of symptoms and each symptom is defined by a separate symptom definition. The processor performs queries of the audit data in accordance with each of the symptoms to generate captured symptom data. The symptoms are scored based on the captured symptom data to generate symptom scores, and the symptom scores are summed to generate a case score. If the case score exceeds an alert threshold specified by the case definition, the processor issues an alert.

7 Claims, 5 Drawing Sheets

(56) References Cited

U.S. PATENT DOCUMENTS

2018/0034842 A1\* 2/2018 Smyth .................... G06N 20/00
2019/0171633 A1\* 6/2019 Demla ................... G06N 20/00
2019/0245734 A1\* 8/2019 Wu .................. G06F 16/24578
2020/0067952 A1\* 2/2020 Deaguero ............. G06F 21/552

\* cited by examiner

DYNAMIC GATHERING OF ATTACK SYMPTOMS

BACKGROUND

The present disclosure relates to techniques for detecting malicious activity in secure computer systems. More specifically, the present disclosure described techniques for gathering and analyzing audit data used in intrusion detection.

BRIEF SUMMARY

According to an embodiment described herein, a system for detecting network intrusions includes a storage device to store audit data generated by a network traffic analyzer in accordance with an audit policy that determines an auditing level. The example system also includes a processor to receive a case defined by a case definition, wherein the case definition comprises a plurality of symptoms and each symptom is defined by a separate symptom definition. The processor performs queries of the audit data in accordance with each of the symptoms to generate captured symptom data. The symptoms are scored based on the captured symptom data to generate symptom scores, and the symptom scores are summed to generate a case score. If the case score exceeds an alert threshold specified by the case definition, the processor issues an alert.

In some embodiments, a method of operation of an intrusion detection system includes receiving a case defined by a case definition, wherein the case definition comprises a plurality of symptoms and each symptom is defined by a separate symptom definition. The example method also includes performing a query of audit data in accordance with each of the symptoms to generate captured symptom data, wherein the audit data is generated by a network traffic analyzer in accordance with an audit policy that determines an auditing level. The example method also includes scoring the symptoms based on the captured symptom data to generate symptom scores, summing the symptom scores to generate a case score, and issuing an alert if the case score exceeds an alert threshold specified by the case definition.

In yet another embodiment, a computer program product for intrusion detection can include a computer readable storage medium having program instructions embodied therewith, wherein the computer readable storage medium is not a transitory signal per se. The program instructions can be executable by a processor to cause the processor to receive a case defined by a case definition, wherein the case definition comprises a plurality of symptoms and each symptom is defined by a separate symptom definition. The program instructions can also cause the processor to perform a query of the audit data in accordance with each of the symptoms to generate captured symptom data, wherein the audit data is generated by a network traffic analyzer in accordance with an audit policy that determines an auditing level. The program instructions can also cause the processor score the symptoms based on the captured symptom data to generate symptom scores, sum the symptom scores to generate a case score, and issue an alert if the case score exceeds an alert threshold specified by the case definition.

DETAILED DESCRIPTION

The present disclosure describes techniques for detecting malicious activity in a secure computer system. Intrusion detection systems are systems that monitor a computing system or network to detect activity that indicates that an unauthorized person is attempting to surreptitiously gain access to protected data or computing systems. A successful attack can result in loss of sensitive data such as passwords, account information, trade secrets, and other proprietary data. Intrusion detection systems monitor computer and network activity to identify suspicious activity to thwart such attacks. The monitoring adds additional processing load to the computer system.

In some instances, an attack may start with trial and error attempts to bypass password protection as well as data collection attempts to find information such as database names, file names, table names, and others. In order to avoid detection, attacks may take the form of a coordinated campaign that may last for several months. Such attacks often involve a low level of dynamic activity that is spread over a long period of time. These types of long-term, slow-moving attacks may be difficult to detect using current intrusion detection techniques, such as anomaly-detection, signature-based-queries, or other machine-learning techniques.

The present disclosure describes an intrusion detection system that monitors computer traffic to identify symptoms of an attack. An example intrusion detection system in accordance with embodiments enables an administrator to define the various symptoms indicative of malicious activity. Traffic within the computer system is then monitored in accordance with an audit policy that determines a level of data collection that applies to various components of the computer system. The monitoring is performed to identify symptoms, which may be scored and correlated to identify complex attacks that occur over a long period of time. Based on the detected activity, the audit policy may be updated to automatically focus the data collection based on the findings. In this way, the intrusion detection system performs a process of dynamic symptom gathering that can add more symptoms gathering base on previous findings, score the findings and then auto-focus the auditing process based on the findings. This enables the intrusion detection system to effectively detect complex attacks that occur over long time periods, and also reduces the processing load of the symptom collection process by automatically focusing the auditing toward components that appear to be targeted by suspicious activity.

Figure 1:
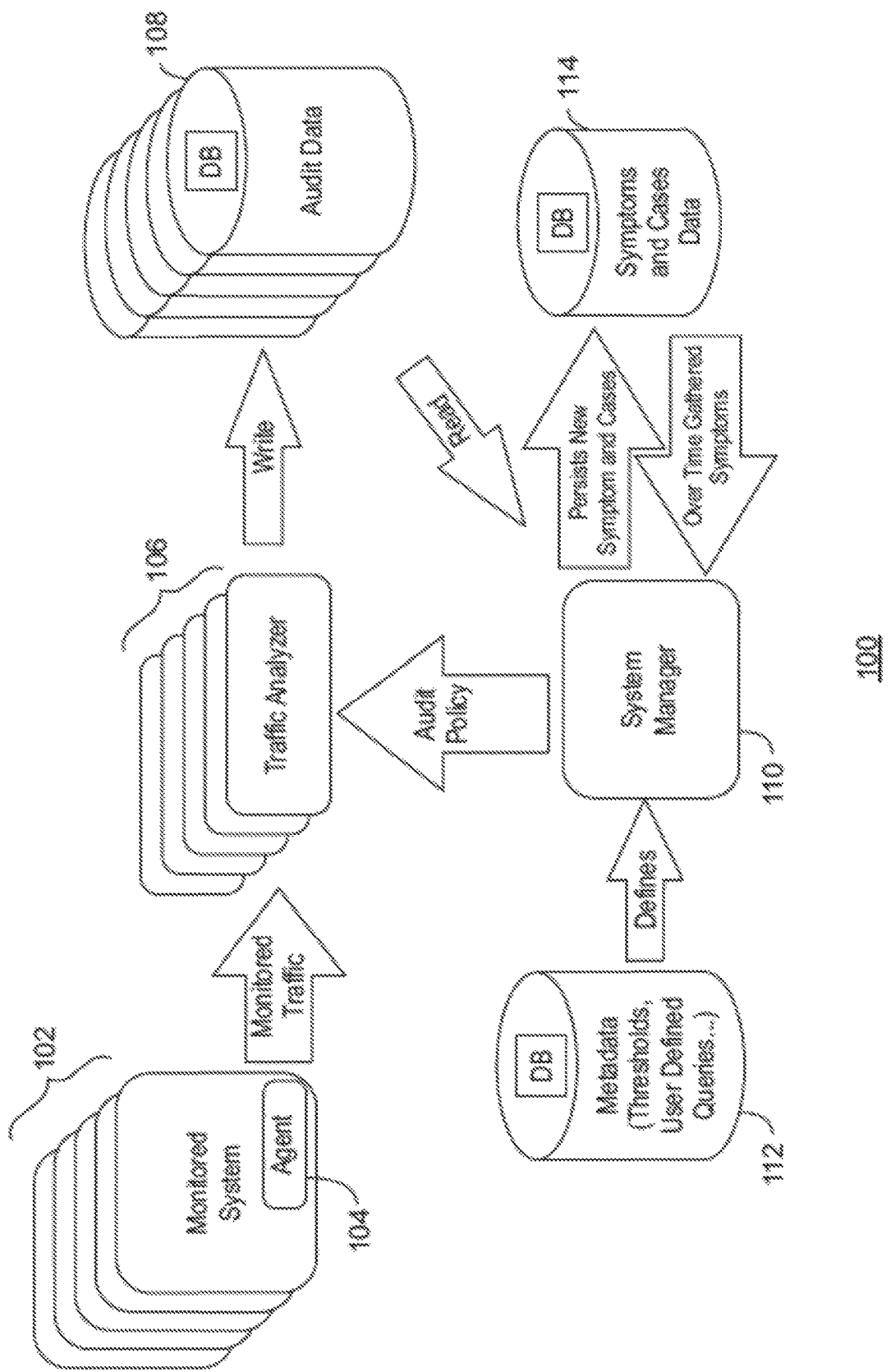
FIG. 1 is a block diagram of an example intrusion detection system according to an embodiment described herein.

FIG. 1 is a block diagram of an example intrusion detection system. The intrusion detection system 100 is integrated with a monitored system 102, which may be any suitable type of computer system, such as a private computer network of a business enterprise or government entity, a cloud computing system, and others. The monitored system 102 may include several workstations, servers, storage networks, routers, and the like. Various components of the monitored system 102 may include a monitoring agent 104, which monitors network traffic and reports the traffic to one or more traffic analyzers 106.

The traffic analyzers 106 filter the monitored traffic to identify audit data to write to a database of audit data 108. The audit data 108 may be in the form of an event log that can be queried to identify anomalous traffic. Each event in the event log includes the type of event and any corresponding information. For example, one type of event may be an invalid login attempt and the event log can include an IP address of the target computer and an IP address of the source computer. Other types of events can include Structured Query Language (SQL) commands, start session, end session, and response information. The information associated with an event may include the OS user, database user, client information, the time ran, the response time, tables, fields, commands, and the query response information. Due to the network overhead and storage capacity required, the traffic analyzers 106 generate audit data for only a portion of the network traffic. The type and amount of audit data generated is controlled by an audit policy. The audit policy determines the amount and type of audit data to be generated based, for example, on the source of the traffic, the destination of the traffic, and the type of traffic. The audit policy can also determine the audit resolution and determine whether to issue an alert or ignore, audit, or block the traffic based on the information associated with an event, the traffic volume, number of record returned, and others.

The audit policy is controlled by a system manager 110, which analyzes the audit data 108 to identify symptoms and cases. As used herein, a symptom is an element of network activity that may correspond with an attack, and a case is a collection of symptoms that are correlated to make a determination regarding whether the symptoms are indicative of an actual attack and what actions should be performed based on the detected symptoms. The cases and the symptoms relevant to each case may be defined by an administrator or other user and stored to a database 112. In embodiments, a symptom is formatted as a database query to be performed on the audit data 108. The terms of the query may specify a query condition to search for, such as an error code, execution of a specific SQL command type, usage of a specific function or stored procedure, modification of sensitive data such as specific tables, and others. With regard to error codes, the types of errors can include login failure, firewall issues, policy blocking, permission violation, syntax errors, and others. The terms of the query may also specify the time period over which to search for the query condition, and identifying information about the source or target computer involved in the symptom, such as IP address, MAC address, user name, email address, and others. The terms of the query may also specify a grouping variable over which to count the number of errors. The grouping variable may be a metric that identifies the source or target of the traffic, such as an IP address, or the data source targeted by the traffic, such as a table or database. The information that identifies the source or target of the traffic may be referred to herein as the operational user. This grouping variable may be referred to herein as an object, which can include the operational user or the data source being targeted for access.

An example symptom may be a query defined to search for a specified query condition (e.g., error code), count the number of instances of the query condition for the same operational entity or data source over a specified time period, and compare the count to one or more specified thresholds. The time period specifies the time window over which to search for the query condition from the present to sometime in the past. The time period may be several days, for example, 30, 60, 90, 180 or more. Additionally, each case may define different levels of symptom lookup, with different symptoms defined for each level.

Each symptom may also define a numerical symptom score to be assigned based on comparing the count to the threshold, with the score increasing depending on the count. For example, if a query performed based on a symptom definition reveals that 3 failed login attempts occurred for a particular data source over the specified time period, a first symptom score may be assigned, whereas if 10 failed login attempts are detected for the data source over the same time period, a second symptom score may be assigned, wherein the second symptom score is higher than the first symptom score.

Each case may be defined by the user and may be formatted as a collection of symptoms. Each case also defines an action to be taken based on the identified symptoms and their symptom scores. In some embodiments, the symptoms scores for all of the symptoms within a case may be summed to generate a combined case score, and actions may be defined based on the combined case score exceeding various thresholds. The actions taken may include changing the audit policy, engaging a different level of symptom lookup, issuing an alert, logging a violation, and others.

The system manager 112 receives the case definitions, which include the symptom definitions, scoring policies, and actions to be taken. The system manager 112 performs the queries of the audit data in accordance with the symptom definitions. Data for each symptom and each case may be stored to a database of case and symptom data 114. The system manager 112 also generates the scores for each symptom in accordance with the scoring policies. If the combined symptom score for a case exceeds one of the pre-defined thresholds, the system manager 110 performs the action or actions associated with that threshold.

The indicated action may include sending a new audit policy to the traffic analyzer 106. The change to the audit policy may cause the traffic analyzer 106 to focus on the specific object captured by the symptom and increase the audit data captured for that object. For example, if the symptom lookup process indicates that a particular data source (e.g., computer, server, database, etc.) experienced a high level of invalid logins over the specified time period, the audit policy may cause the traffic analyzer 106 to perform increased audit data collection for that particular data source. Additionally, if the symptom lookup indicates that a particular operational user (e.g., source IP) has initiated a high level of invalid logins over the specified time period, the audit policy may cause the traffic analyzer 106 to perform increased audit data collection for that particular operational user. Increasing the audit data collection may include performing a full auditing for the effected object to capture all of the network activity generated by or received by the effected object.

The indicated action may also include using a different set of symptoms for issuing queries to the audit data. As mentioned above, each case may define different levels of symptom lookup, with different symptoms defined for each level. Different levels of symptom lookup may be engaged based on the combined score for the case exceeding a defined threshold. The symptoms in the higher level of symptom lookup may make use of information obtained regarding the object or objects captured by symptoms in a lower level of symptom lookup. For example, those symptoms defined for use at a higher level of symptom lookup may look for a different symptom associated with an operational user or data source captured by a symptom query used in the lower level of symptom lookup. Examples, of symptoms that may be searched for at the higher level of symptom lookup may include excessive access, specific commands, specific errors such as special characters, table does not exist, user from multiple clients, user created and dropped within a short period of time, use of a predefined user or schema dormant user, and others.

The indicated action may also include sending an alert message regarding an attempted intrusion. The alert message may be defined to send the alert to the proper role, such as a system administrator. The alert message may also be defined to include corresponding information about the attempted intrusion, such as the operation user involved in the intrusion (source or target) and the data source involved in the intrusion. One or more alert types may be defined and associated with corresponding case score thresholds that trigger the sending of the alert messages.

The indicated action may also include logging the attempted intrusion to a violation log. Logging the attempted intrusion may be include storing all of the case data, with its associated symptom data, to the database of symptom and case data 114 or other storage system. The log may be read by system administrator or other user.

In addition to increasing the audit level or the symptom lookup level in response to the combined case score, the system manager 110 may also reduce the audit level or symptom lookup level if the case score falls below the pre-defined threshold within the specified time period. The system described herein thereby enables long-term, slow-moving attacks to be tracked over an extended period of time, for example, several days, weeks, or months. The system also enables focused auditing by causing the traffic analyzers 106 to perform traffic monitoring that is focused to potential threats.

Figure 2:
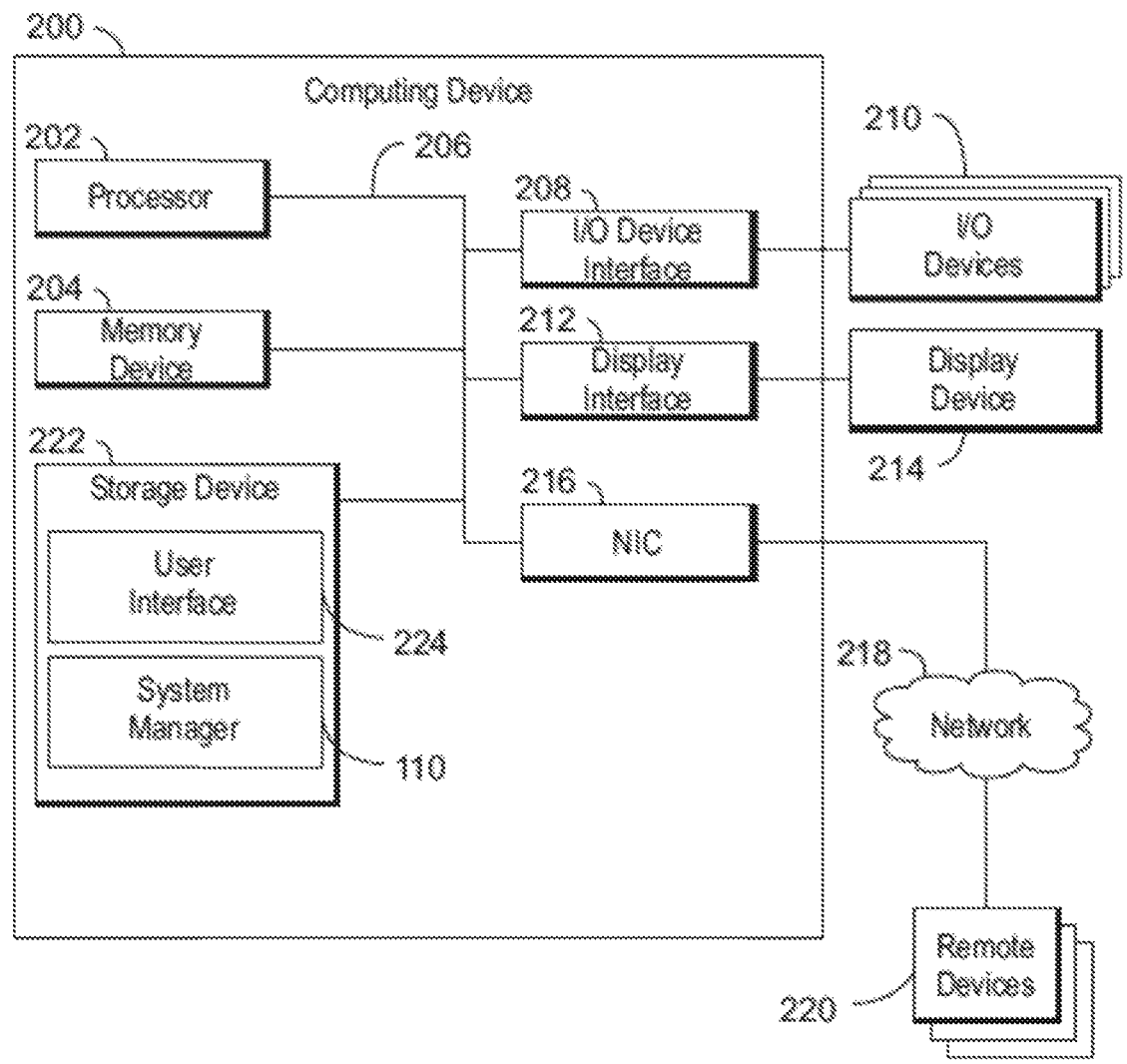
FIG. 2 is a block diagram of an example computing system configured to perform intrusion detection according to an embodiment described herein.

FIG. 2 is a block diagram of an example computing device configured to implement intrusion detection. The computing device 200 may be for example, a server, desktop computer, laptop computer, and others. In some examples, computing device 200 may be a cloud computing node. Computing device 200 may be described in the general context of computer system executable instructions, such as program modules, being executed by a computer system. Generally, program modules may include routines, programs, objects, components, logic, data structures, and so on that perform particular tasks or implement particular abstract data types. Computing device 200 may be practiced in distributed cloud computing environments where tasks are performed by remote processing devices that are linked through a communications network. In a distributed cloud computing environment, program modules may be located in both local and remote computer system storage media including memory storage devices.

The computing device 200 may include a processor 202 that is adapted to execute stored instructions, a memory device 204 to provide temporary memory space for operations of said instructions during operation. The processor can be a single-core processor, multi-core processor, computing cluster, or any number of other configurations. The memory 204 can include random access memory (RAM), read only memory, flash memory, or any other suitable memory systems.

The processor 202 may be connected through a system interconnect 206 (e.g., PCI®, PCI-Express®, etc.) to an input/output (I/O) device interface 208 adapted to connect the computing device 200 to one or more I/O devices 210. The I/O devices 210 may include, for example, a keyboard and a pointing device, wherein the pointing device may include a touchpad or a touchscreen, among others. The I/O devices 210 may be built-in components of the computing device 200, or may be devices that are externally connected to the computing device 200.

The processor 202 may also be linked through the system interconnect 206 to a display interface 212 adapted to connect the computing device 200 to a display device 214. The display device 214 may include a display screen that is a built-in component of the computing device 200. The display device 214 may also include a computer monitor, television, or projector, among others, that is externally connected to the computing device 200. In addition, a network interface controller (NIC) 216 may be adapted to connect the computing device 200 through the system interconnect 206 to the network 218. In some embodiments, the NIC 216 can transmit data using any suitable interface or protocol, such as the internet small computer system interface, among others. The network 218 may be a cellular network, a radio network, a wide area network (WAN), a local area network (LAN), or the Internet, among others. Various remote devices 220 may be connected to the computing device 200 through the network 218. The remote devices 220 may include components of the monitored system, traffic analyzers, storage devices, and others.

In some examples, the processor 202 can be linked through the system interconnect 206 to the storage device 222, which can include a user interface 224 and the intrusion detection system manager 110. The user interface 224 enables a user to generate the case definitions, which includes the symptom definitions associated with each case, the scoring policy for each symptom, and the actions to be performed based on the symptom scores. The case definitions may be stored to the storage device 222 for retrieval by the system manager. The system manager may be communicatively coupled to the components of an intrusion detection system 100, such as one or more traffic analyzers 106 and a database of audit data 108 (FIG. 1). The audit data may be stored to the storage device 222 or may be stored to one or more of the remote devices 220. The system manager 110 performs the queries of the audit data pursuant to the symptom definitions, generates a combined symptom score for each of the cases, and performs the actions that apply for each of a plurality of score thresholds, such as sending alerts, updating the audit policy, updating the symptom lookup level and others. A process for operating an intrusion detection system is described in more detail in relation to FIG. 3.

It is to be understood that the block diagram of FIG. 2 is not intended to indicate that the computing device 200 is to include all of the components shown in FIG. 2. Rather, the computing device 200 can include fewer or additional components not illustrated in FIG. 2 (e.g., additional memory components, embedded controllers, modules, additional network interfaces, etc.). Furthermore, any of the functionalities of the user interface 224 and the intrusion detection system manager 110 are partially, or entirely, implemented in hardware and/or in the processor 202. For example, the functionality may be implemented with an application specific integrated circuit, logic implemented in an embedded controller, or in logic implemented in the processor 202, among others. In some embodiments, functionalities are implemented with logic, wherein the logic, as referred to herein, can include any suitable hardware (e.g., a processor, among others), software (e.g., an application, among others), firmware, or any suitable combination of hardware, software, and firmware.

Figure 3:
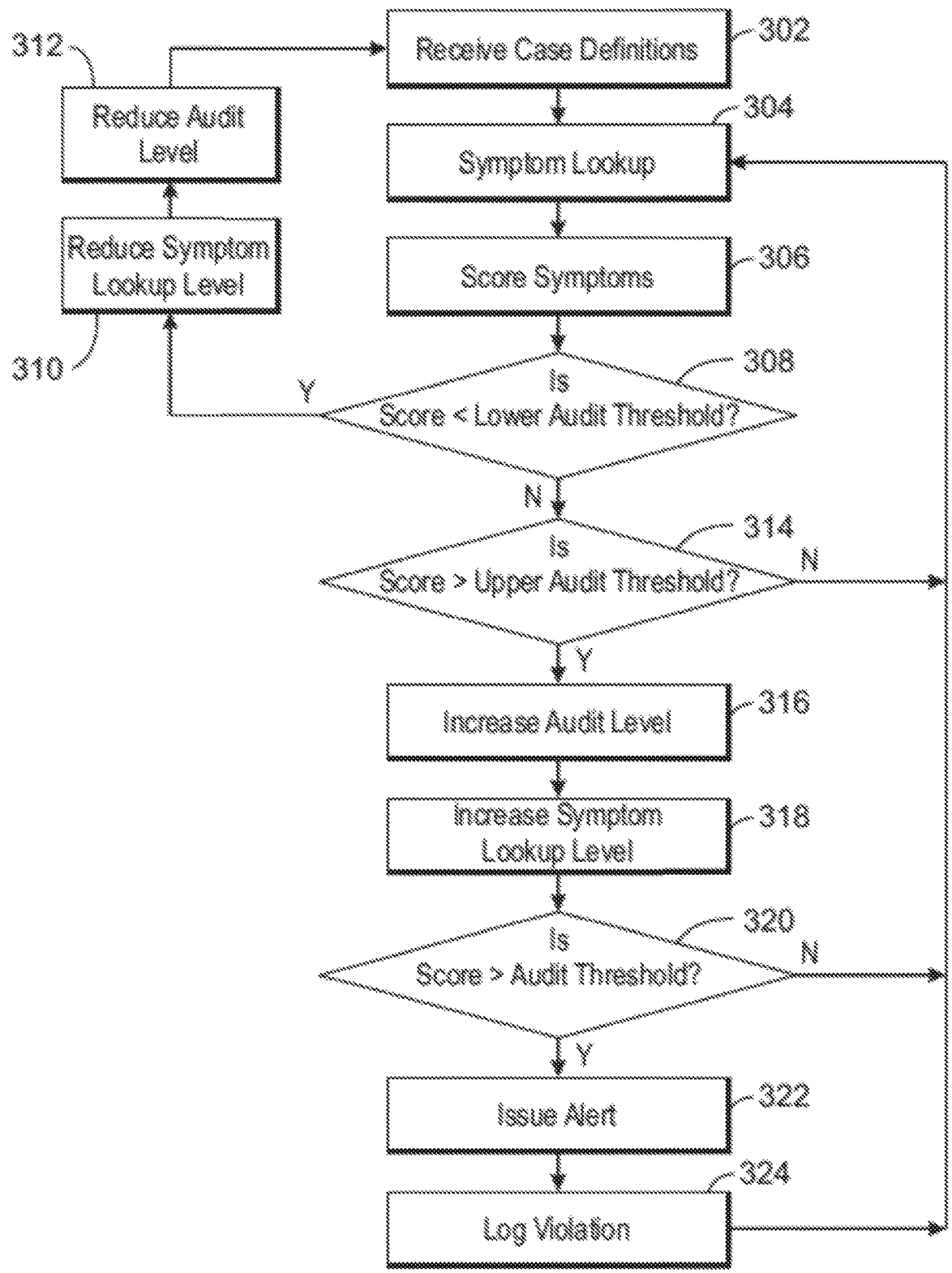
FIG. 3 is a process flow diagram of an example method of operation of an intrusion detection system according to an embodiment described herein.

FIG. 3 is a process flow diagram of an example method of operation of an intrusion detection system. The method 300 can be implemented with any suitable computing device, such as the computing device 200 of FIG. 2. The method 300 begins with a starting audit level and symptom lookup level, which may be updated depending on the results of the network traffic monitoring as described below. At the beginning of the method, a certain amount of audit data will already have been collected by one or more traffic analyzers, which continue to capture network traffic in parallel with the operation of the method 300.

At block 302, the case definitions are received. The case definitions may be defined by the user, and retrieved from a storage device. Each case may be designed to identify different types of intrusions and can include a plurality of symptom definitions. Each symptom may be associated with a different symptom lookup level.

At block 304, a query of the audit data is performed according to the symptom definitions. The query of the audit data may also be referred to as a symptom lookup. Queries may be performed for each case and for each of the symptoms specified for the current symptom lookup level. For example, the captured symptom data may include a count of a number of errors that have occurred over a specified time period relative to a specified grouping element, such as a specific data source or operational user. The results of the queries, i.e., the captured symptom data, may be stored to a persistent storage device such as a database.

At block 306, the symptoms are scored according the scoring technique defined for each symptom. For example, if the captured symptom data includes an error count, the error count may be compared to one or more thresholds to assign the score. The symptom scores for a case may also be summed to generate a combined symptom score, also referred to herein as the case score.

At block 308, a determination is made regarding whether the case score is below the lower audit threshold. As used herein, the lower audit threshold refers to the nearest audit threshold below the current case score. There may be a range of audit thresholds, each corresponding to different audit levels. The case score may have been increased above the lower audit threshold in a previous iteration of the process. If the case score is below the lower audit threshold, then the process advances to block 310.

At block 310, the symptom lookup level is reduced. At block 312, the audit level is reduced and a new audit policy consistent with the new audit level is sent to the traffic analyzers. The process then returns to block 304. If, at block 308, the case score is not below the lower audit threshold, the process advances to block 314.

At block 314, a determination is made regarding whether the case score is above the upper audit threshold. As used herein, the upper audit threshold refers to the nearest audit threshold above the current case score. If the score is not above the upper audit threshold, then the process returns to block 304. If the score is above the upper audit threshold, then the process advances to block 316.

At block 316, the audit level is increased and a new audit policy consistent with the new audit level is sent to the traffic analyzers. The new audit policy may increase the auditing level for a specific object captured by the symptom data, such as a specific operational user or data source. At block 318, the symptom lookup level is increased. The process then advances to block 320.

At block 320, a determination is made regarding whether the score is above an alert threshold. If the score is not above the alert threshold, the process returns to block 304. If the score is above the alert threshold, the process advances to block 322 and an alert is issued. At block 324, a violation is logged. The process then returns to block 304.

The process flow diagram of FIG. 3 is not intended to indicate that the operations of the method 300 are to be executed in the order shown, or that all of the operations of the method 300 are to be included in every case. Additionally, the method 300 can include additional operations. Additional variations on the above method 300 may be made within the scope of the described subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
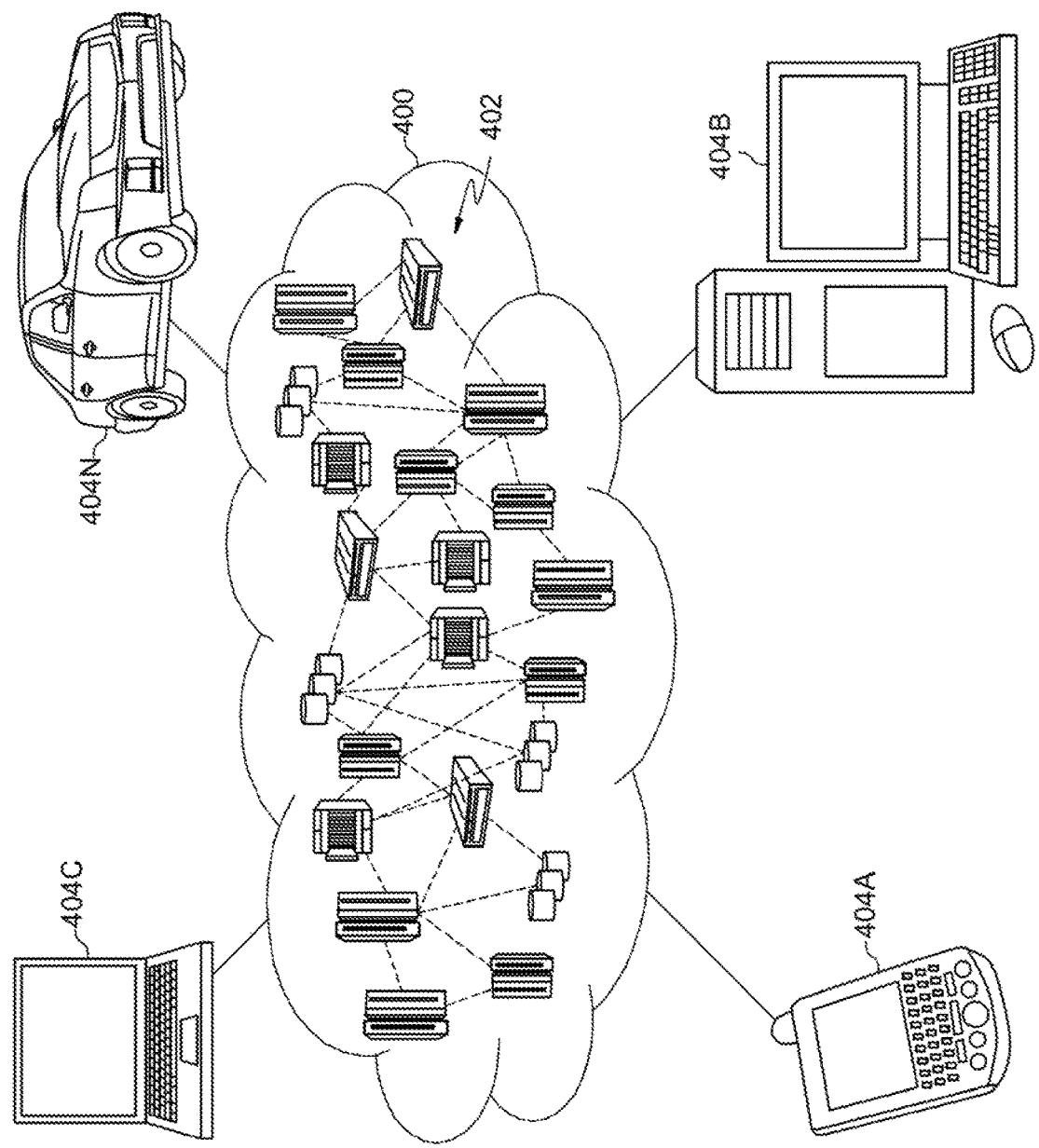
FIG. 4 depicts an illustrative cloud computing environment according to an embodiment described herein.

Referring now to FIG. 4, an illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
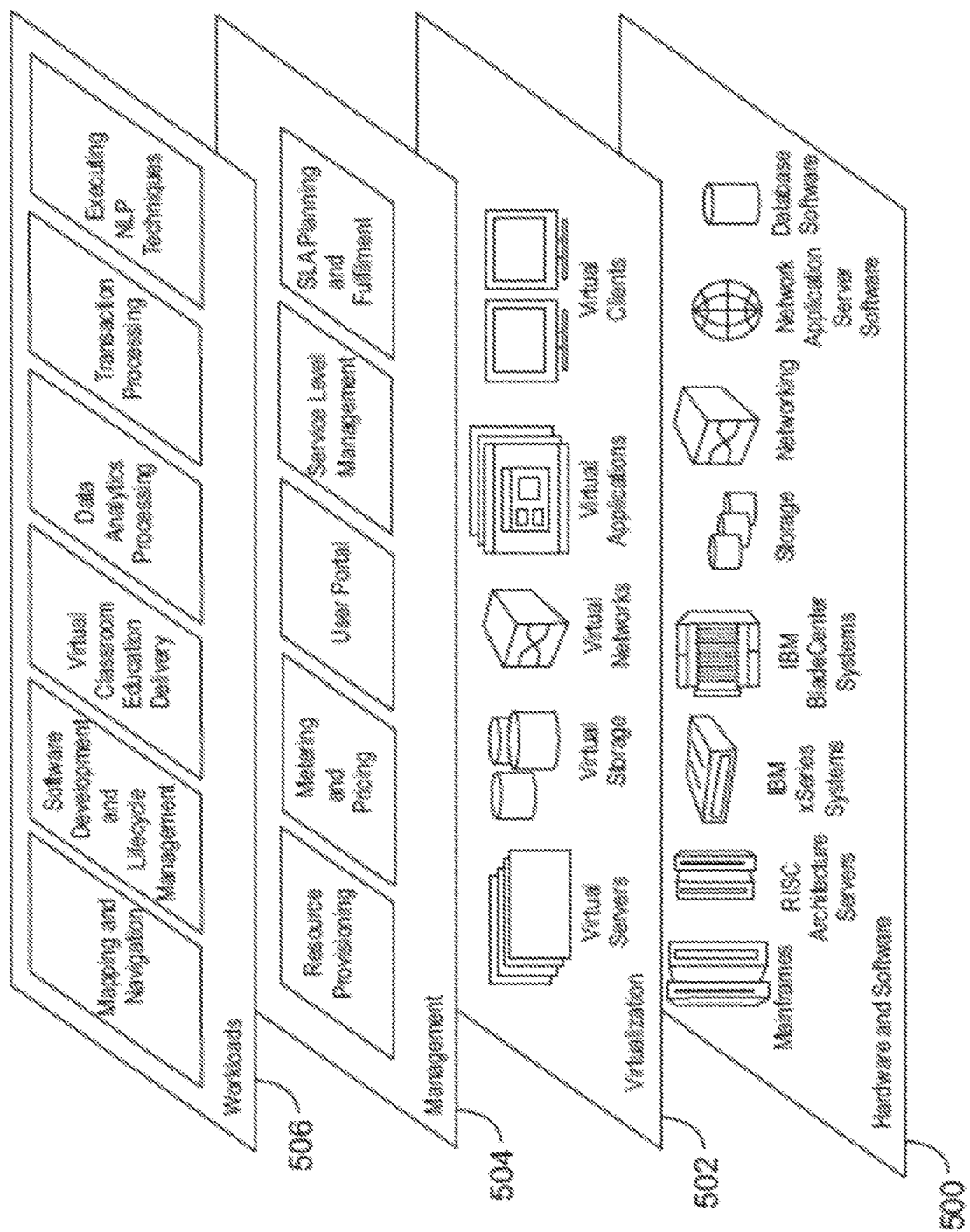
FIG. 5 depicts a set of functional abstraction layers provided by a cloud computing environment according to an embodiment described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and intrusion detection.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for detecting network intrusions, comprising:
   a storage device to store audit data generated by a network traffic analyzer in accordance with an audit policy that determines an auditing level; and
   a processor to:
   receive a case defined by a case definition, wherein the case definition comprises a plurality of symptoms and each symptom is defined by a separate symptom definition, wherein each of the plurality of symptoms is associated with a corresponding symptom lookup level, and wherein the case definition specifies a plurality of audit thresholds that determine the symptom lookup level to be applied based on a comparison of the case score with the plurality of audit thresholds;
   perform a query of the audit data in accordance with each of the symptoms to generate captured symptom data, wherein the symptom definition specifies a query condition, a time period over which to search for the query condition, and a grouping object over which to count occurrences of the query condition over the time period;
   score the symptoms based on the captured symptom data to generate symptom scores;
   sum the symptom scores to generate a case score;
   compare the case score to an upper audit threshold specified by the case definition and, when the case score is above the upper audit threshold, increase the symptom lookup level and update the audit policy to increase the audit level for an object identified in the captured symptom data, wherein the symptom lookup level determines which of the plurality of symptoms are used to query the audit data;
   compare the case score to a lower audit threshold specified by the case definition and, when the case score is below the lower audit threshold, reduce the symptom lookup level and update the audit policy to reduce the audit level, wherein the symptom lookup level determines which of the plurality of symptoms are used to query the audit data; and
   issue an alert when the case score exceeds an alert threshold specified by the case definition.

2. The system of claim 1, wherein the time period is equal to or greater than 60 days.

3. The system of claim 1, wherein the processor is to log the case as a violation when the case score exceeds the alert threshold specified by the case definition.

4. A method of operation of an intrusion detection system, the method comprising:
   receiving a case defined by a case definition, wherein the case definition comprises a plurality of symptoms and each symptom is defined by a separate symptom definition, wherein each of the plurality of symptoms is associated with a corresponding symptom lookup level, and wherein the case definition specifies a plurality of audit thresholds that determine the symptom lookup level to be applied based on a comparison of the case score with the plurality of audit thresholds;
   performing a query of audit data in accordance with each of the symptoms to generate captured symptom data, wherein the audit data is generated by a network traffic analyzer in accordance with an audit policy that determines an auditing level, wherein the symptom definition specifies a query condition, a time period over which to search for the query condition, and a grouping object over which to count occurrences of the query condition over the time period;
   scoring the symptoms based on the captured symptom data to generate symptom scores;
   summing the symptom scores to generate a case score;
   comparing the case score to an upper audit threshold specified by the case definition and, when the case score is above the upper audit threshold, increasing the symptom lookup level and updating the audit policy to increase the audit level for an object identified in the captured symptom data, wherein the symptom lookup level determines which of the plurality of symptoms are used to query the audit data;
   comparing the case score to a lower audit threshold specified by the case definition a nd, when the case score is below the lower audit threshold, reducing the symptom lookup level and updating the audit policy to reduce the audit level, wherein the symptom lookup level determines which of the plurality of symptoms are used to query the audit data; and
   issuing an alert when the case score exceeds an alert threshold specified by the case definition.

5. The method of claim 4, wherein the time period is equal to or greater than 60 days.

6. The method of claim 4, comprising logging the case as a violation when the case score exceeds the alert threshold specified by the case definition.

7. A computer program product for intrusion detection comprising a computer readable storage medium having program instructions embodied therewith, wherein the computer readable storage medium is not a transitory signal per se, and wherein the program instructions are executable by a processor to cause the processor to:
   receive a case defined by a case definition, wherein the case definition comprises a plurality of symptoms and each symptom is defined by a separate symptom definition, wherein each of the plurality of symptoms is associated with a corresponding symptom lookup level, and wherein the case definition specifies a plurality of audit thresholds that determine the symptom lookup level to be applied based on a comparison of the case score with the plurality of audit thresholds;
   perform a query of the audit data in accordance with each of the symptoms to generate captured symptom data, wherein the audit data is generated by a network traffic analyzer in accordance with an audit policy that determines an auditing level, wherein the symptom definition specifies a query condition, a time period over which to search for the query condition, and a grouping object over which to count occurrences of the query condition over the time period;

score the symptoms based on the captured symptom data to generate symptom scores;

sum the symptom scores to generate a case score;

compare the case score to an upper audit threshold specified by the case definition and, when the case score is above the upper audit threshold, increase the symptom lookup level and update the audit policy to increase the audit level for an object identified in the captured symptom data, wherein the symptom lookup level determines which of the plurality of symptoms are used to query the audit data;

comparing the case score to a lower audit threshold specified by the case definition and, when the case score is below the lower audit threshold, reduce the symptom lookup level and update the audit policy to reduce the audit level, wherein the symptom lookup level determines which of the plurality of symptoms are used to query the audit data; and issue an alert when the case score exceeds an alert threshold specified by the case definition.

\* \* \* \* \*